United States Patent
Ueyama et al.

(10) Patent No.: US 9,688,376 B2
(45) Date of Patent: Jun. 27, 2017

(54) BALLAST WATER TREATMENT SYSTEM FOR SHIP

(71) Applicant: SUMITOMO ELECTRIC INDUSTRIES, LTD., Osaka-shi, Osaka (JP)

(72) Inventors: Munetsugu Ueyama, Osaka (JP); Isao Ozawa, Osaka (JP); Kenichiro Miyatake, Osaka (JP); Ryusuke Nakai, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/234,559

(22) PCT Filed: Feb. 8, 2013

(86) PCT No.: PCT/JP2013/053006
§ 371 (c)(1),
(2) Date: Jan. 23, 2014

(87) PCT Pub. No.: WO2013/125368
PCT Pub. Date: Aug. 29, 2013

(65) Prior Publication Data
US 2014/0175021 A1    Jun. 26, 2014

(30) Foreign Application Priority Data

Feb. 24, 2012    (JP) .................................. 2012-038474

(51) Int. Cl.
B63J 4/00    (2006.01)
C02F 1/00    (2006.01)
(Continued)

(52) U.S. Cl.
CPC ............ *B63J 4/002* (2013.01); *B01D 33/073* (2013.01); *B01D 33/463* (2013.01); *C02F 1/001* (2013.01); *C02F 1/32* (2013.01); *C02F 2103/008* (2013.01)

(58) Field of Classification Search
None
See application file for complete search history.

(56) References Cited

U.S. PATENT DOCUMENTS

2012/0312757 A1    12/2012    Ueyama et al.
2013/0319953 A1    12/2013    Ozawa et al.

FOREIGN PATENT DOCUMENTS

CN    101835528 A    9/2010
CN    102309924 A    1/2012
(Continued)

*Primary Examiner* — Robert James Popovics
(74) *Attorney, Agent, or Firm* — Drinker Biddle & Reath LLP (57) ABSTRACT

Provided are a system and a method for treating ballast water for a ship, the system including a rotary filtration apparatus including a filter that is cylindrically formed so as to surround an axis, that is rotatable around the axis, and that has a pleated shape that is folded in a cylinder radial direction; and an electric motor for rotating the filter. A distance between the cleaning nozzle and a recess of the filter is 120 mm or less. The system and the method are configured to perform a steady-state operation that satisfies the following conditions a to d:
a) a rotation speed of the filter during a filtering operation is in the range of 20 to 100 rpm,
b) a flow speed of cleaning water ejected from the cleaning nozzle is 250 m/min or more,
c) a flow rate of filtered water per unit area of the filter is 5.1 m/h or less, and (Continued)

d) a flow rate of discharged water discharged from the discharge channel is 5% of the flow rate of filtered water or more.

1 Claim, 5 Drawing Sheets (51) Int. Cl.
*B01D 33/073* (2006.01)
*B01D 33/46* (2006.01)
C02F 1/32 (2006.01)
C02F 103/00 (2006.01)

(56) References Cited

FOREIGN PATENT DOCUMENTS

| EP | 1 975 130 A2 | 10/2008 |
| JP | 3660984 B2 | 6/2005 |
| JP | 2006-000728 A | 1/2006 |
| JP | 4261955 B2 | 5/2009 |
| JP | 2011-005456 A | 1/2011 |
| JP | 2011-194396 A | 10/2011 |
| WO | WO 2011/105260 A1 | 9/2011 |

BALLAST WATER TREATMENT SYSTEM FOR SHIP

CROSS-REFERENCE TO RELATED APPLICATIONS

This application is the national stage of International Application No. PCT/JP2013/053006 filed on Feb. 8, 2013, which claims priority to Japanese Application No. 2012-038474 filed on Feb. 24, 2012, each of which is incorporatd by reference herein in the entirety.

TECHNICAL FIELD

The present invention relates to a system for treating ballast water that is stored in a ship in order to stabilize the ship when the ship is underway. In particular, the present invention relates to high-level treatment of ballast water that is taken on board a ship and then discharged to another sea area.

BACKGROUND ART

In recent years, treatment of ballast water stored in a ship has become an issue. Ballast water is sea water that is stored in a ship in order to enable the ship to sail safely when the ship is not carrying cargo. Ballast water is taken into a ship from the ocean near a departure port and is discharged to the ocean near a destination port. That is, in a case where sea water taken into a ship as ballast water at a departure port is discharged at a destination port, such as a case where an oil tanker leaves a port in Japan and arrives at a port in a Middle East oil-producing country, such as Kuwait, and loads oil at the port, sea water in a sea area in Japan is taken on board the ship as ballast water and discharged to a sea area in the Middle East. In such a case, because ballast water is discharged to a sea area that is different from a sea area from which the ballast water was originally taken, organisms in the sea water are transferred to a sea area that is not their native habitat and may have a significant effect on marine ecosystems.

Therefore, various methods for purifying ballast water to remove, kill, or inactivate microorganisms have been examined. For example, PTL 1 describes a method for killing aquatic organisms by heating sea water. PTL 2 discloses a method using steam, a method using ultraviolet irradiation, electrical methods using voltage application and an impact wave, a method using a chemical agent such as sodium hypochlorite, and the like. Filtration methods have been also examined as pretreatment before performing killing treatments described above or in order to remove comparatively large microorganisms. For example, PTL 3 discloses a process for producing ballast water by using a membrane filter.

The inventors examined such treatment of ballast water and disclosed a filtration apparatus including a rotating cylindrical pleated filter described in PTL 4. The ballast water treatment apparatus includes a filter that is cylindrically formed so as to surround an axis and that is rotatable around the axis; an untreated water nozzle that ejects untreated water toward an outer peripheral surface of the filter; a case that includes an outer cylindrical portion that is disposed so as to surround the filter, a nozzle opening of the untreated nozzle being located inside the case; a filtered water channel through which filtered water that has passed through the filter flows from a cylindrical space inside the filter to outside of the case; and a discharge channel through which discharged water that has not passed through the filter is discharged to outside of the case. With such a structure, untreated water is ejected toward the outer peripheral surface of the cylindrically formed filter from the outside of the filter, so that untreated water is filtered while the filter rotates and the surface of the filter continuously moves. Thus, it is possible to continue filtering untreated water while preventing the filter from being clogged, and it is possible to remove foreign substances from untreated water more efficiently than in a case where a flat filter having the same area is used.

PATENT LITERATURE

PTL 1: Japanese Patent No. 3660984
PTL 2: Japanese Patent No. 4261955
PTL 3: Japanese Unexamined Patent Application Publication No. 2006-728
PTL 4: Japanese Unexamined Patent Application Publication No. 2011-194396

SUMMARY OF INVENTION

Technical Problem

Existing ballast water treatment methods described in PTLs 1 to 3 each have their own problems. In order to solve the problems, the inventors developed the treatment apparatus described in PTL 4. Because ballast water is made up of a large amount of sea water, it is required that treatment of ballast water be performed as fast as possible within a limited time during which the ship is at anchor. However, when filtration using a filter is performed for a long time, the filter may become clogged. If it becomes necessary to replace the filter every time clogging occurs, a significant loss due to idle time occurs. The rotary filtration apparatus described in PTL 4 simultaneously performs cleaning of the pleated filter and filtration by continuously ejecting cleaning water toward a filtration surface while rotating the filter. However, if the disposition of the filter and the operating conditions are not appropriate, the effect of cleaning the filter cannot be sufficiently obtained. As a result, a problem arises in that, for example, the filter becomes clogged and it becomes necessary to stop operating the filtration apparatus before a necessary amount of water is filtered. Hence, an object of the present invention is to provide a ballast water treatment system that can perform a non-stop steady-state operation for a long time.

Solution to Problem

The inventors have made the present invention as a result of intensively examining means that can be mounted in a ship and that can efficiently purify ballast water.

According to the present invention, provided are a system and a method for treating ballast water for a ship, the system including a rotary filtration apparatus including a filter that is cylindrically formed so as to surround an axis, that is rotatable around the axis, and that has a pleated shape that is folded in a cylinder radial direction; a cleaning nozzle that ejects untreated water toward an outer peripheral portion of the filter; a case that includes an outer cylindrical portion that is disposed so as to surround the filter, a nozzle opening of the cleaning nozzle being disposed inside the case; a filtered water channel through which filtered water that has passed through the filter flows from a cylindrical space inside the filter to outside of the case; a discharge channel through which discharged water that has not passed through the filter is discharged to outside of the case; and an electric motor for rotating the filter. A distance between the cleaning nozzle and a recess of the filter is 120 mm or less. The system and the method are configured to perform a steady-state operation that satisfies the following conditions a to d:

a) a rotation speed of the filter during a filtering operation is in the range of 20 to 100 rpm, b) a flow speed of cleaning water ejected from the cleaning nozzle is 250 m/min or more, c) a flow rate of filtered water per unit area of the filter is 5.1 m/h or less, and d) a flow rate of discharged water discharged from the discharge channel is 5% of the flow rate of filtered water or more.

As described above, the inventors intensively examined appropriate conditions under which a rotary filtration apparatus is to be operated. As a result, the inventors found that, as a factor that influences a steady-state filtration operation, there is a relationship between the cleaning effect and the flow rate of discharged water. Accordingly, the inventors found factors and conditions for realizing a long time steady-state operation. When the apparatus having the structure described above satisfies the operation conditions a) to d), it is possible to perform a ballast water treatment operation, which is needed for a general ship, without stopping the operation due to clogging.

Untreated water that flows into a filtration apparatus is divided into filtered water, which is filtered and used as ballast water, and discharged water, which is not filtered and discharged. Therefore, (flow rate of untreated water)=(flow rate of filtered water)+(flow rate of discharged water). In a case where the filtration apparatus is operated while maintaining a necessary flow rate of filtered water, if the flow rate of discharged water is gradually decreased, the concentration of suspended particles in untreated water that are not filtered and accumulated in the case gradually increases. As a result, clogging becomes more likely to occur. On the other hand, increasing the flow rate of discharged water is disadvantageous in terms of the efficiency of the entirety of filtration operation. Therefore, there exists an appropriate relationship between the flow rate of filtered water and the flow rate of discharged water. Even when the flow rate of filtered water is stable, clogging develops if the cleaning effect of the filter, which is membrane filter, is weak. The inventors confirmed that the disposition of the cleaning water nozzle, the flow rate of cleaning water, and the rotation speed of the filter contribute to appropriate cleaning.

In the present invention, sea water that is subjected to treatment is not particularly limited. In general, sea water in a port, in which ships are at anchor, includes microorganisms and suspended particles and has a turbidity in the range of about 1 to 1000 nephelometric turbidity unit (NTU). Examples of harmful microorganisms in sea water include Escherichia coli; Vibrio cholerae; Enterococcus; and larvae of plankton such as water flea, asteroidean, and seaweed. The sizes of these microorganisms are mostly in the range of 0.3 to several hundred μm. A filter is used to remove suspended particles and microorganisms from sea water. Suspended particles to be removed include non-organic components, such as silica, and have various sizes. In order to effectively remove such microorganisms, a filter that can remove planktons in sea water having a size of 50 μm or more, preferably 30 μm or more, and more preferably 10 μm or more is used. In order to obtain the advantages of the present invention, it is preferable that the filter can remove 99% or more of microorganisms in sea water having a size of 30 μm or more. In particular, the present application is effective in treating a large amount of ballast water by using a filter having a large area of 5 m$^2$ or more. Preferably, the present application is effective in terms of a long time operation when used in a large apparatus having an effective filtration area of 30 m$^2$ or more.

With the apparatus and the method according to the present invention, when treating sea water having a turbidity in the range of 1 to 1000 NTU, it is possible to continue a steady-state operation for 12 hours or more, that is, it is possible to continue at least a 12-hour steady-state operation, and the apparatus and the method can be appropriately used for ballast water treatment.

Advantageous Effects of Invention

With the present invention, a ballast water treatment system that can perform a non-stop steady-state operation for a long time can be provided.

REFERENCE SIGNS LIST 10 ballast water treatment system
11 tank
12 rotary filtration apparatus
13 ultraviolet irradiation device
21, 22 pump
31, 32, 33, 34, 35, 36, 37, 38 pipe
101 filter
102 cleaning water nozzle
103 case
104 central pipe
105 water intake hole
106 untreated water channel
107 filtered water channel
108 discharge channel
112 untreated water nozzle
121 nozzle opening
131 outer cylindrical portion
132 cover portion
133 bottom portion
140 electric motor
141 shaft 151 water intake channel
152 pump
153 cleaning water channel

DESCRIPTION OF EMBODIMENTS

The structure of a ballast water treatment system for a ship and a method of treating ballast water according to the present invention will be described with reference to the drawings. The present invention is not limited to these but is described in the claims, and is intended to include all modifications within the scope of the claims and the equivalents thereof.

Figure 1:
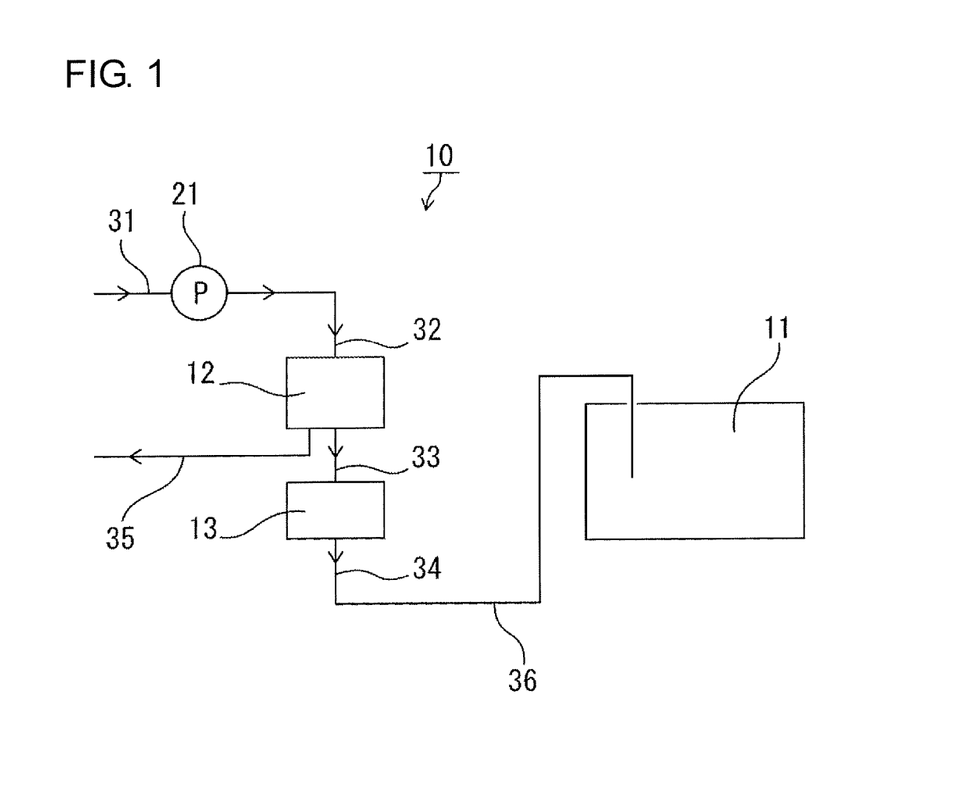
FIG. 1 is a block diagram showing a typical overall structure of a ballast water treatment system for a ship according to the present invention.

FIG. 1 schematically illustrates the overall structure of a ballast water treatment system for a ship according to the present invention. Referring to FIG. 1, untreated water, which is sea water taken from the ocean, is fed by a pump 21 through a pipe 31, and the untreated water is supplied through a pipe 32 to a filtration apparatus 12, which is filtration means. Filtered water, which has been filtered by the filtration apparatus 12, flows through a pipe 33 to sterilization means 13 (which is optional), such as an ultraviolet irradiation device. Discharged water, which has not been filtered by the filtration apparatus 12, flows through a pipe 35 to the outside of the apparatus. Sterilized sea water flows through pipes 34 and 36 to a tank 11.

Figure 2:
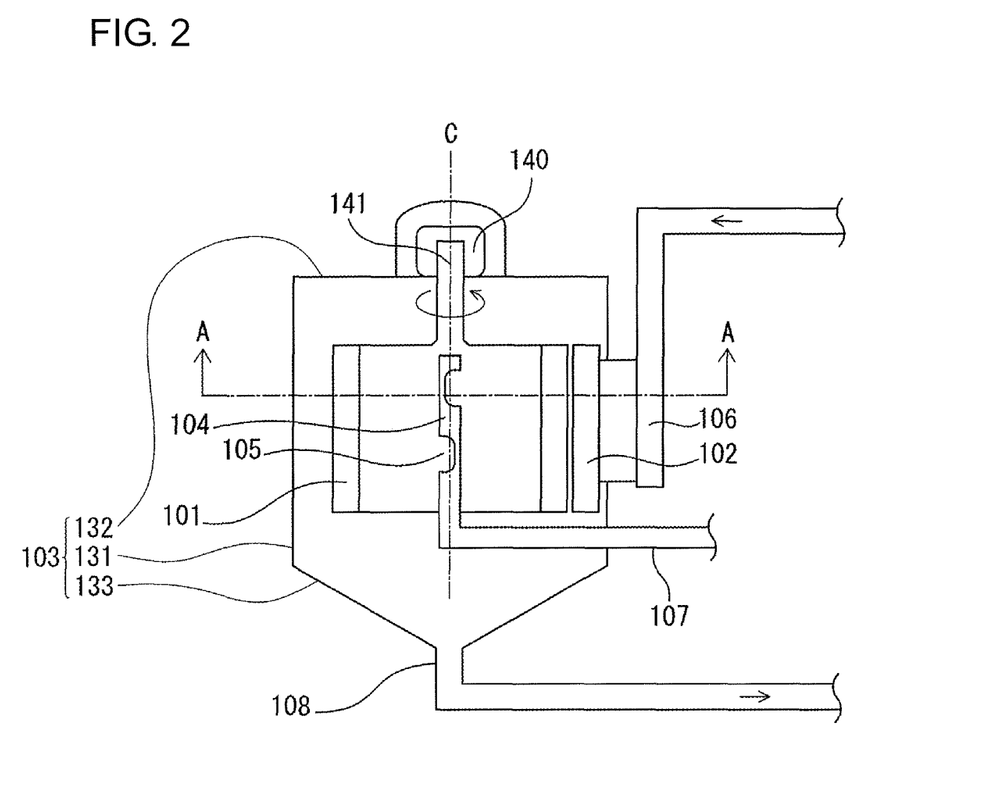
FIG. 2 is a schematic longitudinal sectional view showing an exemplary structure of a rotary filtration apparatus used in the present invention.
Figure 3:
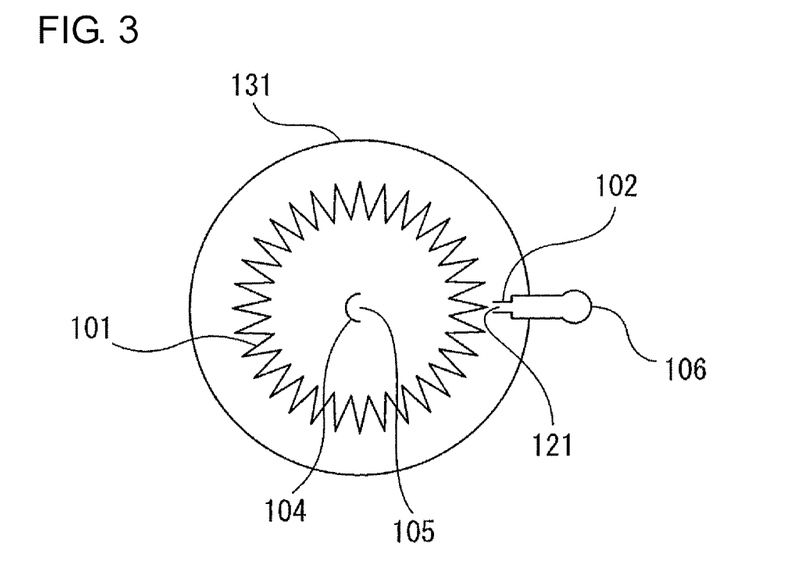
FIG. 3 is a schematic cross-sectional view taken along line A-A of FIG. 2.

FIGS. 2 and 3 are schematic views showing a typical structure of a rotary filtration apparatus, which is filtration means. FIG. 2 is a longitudinal sectional view of the rotary filtration apparatus. FIG. 3 is a cross-sectional view taken along line A-A of FIG. 2. A cylindrical filter 101 is disposed so as to surround a shaft 141, which serves as the center of rotation. The filter 101 is attached so as to be rotatable around a central pipe (that does not rotate and) that is disposed at the center. Preferably used as the filter is a pleated filter having folds that are formed so that protrusions and recesses are alternately arranged in the radial direction of the cylinder. The upper and lower sides of the filter are closed so as to be watertight. It is necessary that a rotatable attachment structure be also watertight, but the attachment structure is not particularly limited and a known structure is used. A case 103 covers the entirety of the filter 101. The case 103 includes an outer cylindrical portion 131, a cover portion 132, and a bottom portion 133. A discharge channel 108 is connected to the bottom portion 133. Sea water, which is untreated water, flows into the case 103 through an untreated water channel 106. A cleaning water nozzle 102 ejects untreated water, which is cleaning water, toward a filtration surface of the filter 101. The cleaning water nozzle 102 extends from the untreated water channel 106 so that a nozzle opening 121 thereof is located inside the outer cylindrical portion 131 of the case 103. Therefore, untreated water is ejected toward the outer peripheral surface of the filter.

In the present embodiment, untreated water ejected from the cleaning water nozzle hits the pleated outer peripheral surface of the pleated filter. The pressure of the untreated water produces an effect of cleaning the filter. The shaft 141 of an electric motor 140 is connected to a central shaft of the cylindrical filter 101, so that the filter 101 is rotated by the electric motor 140. As the filter 101 rotates, different portions of the filter are successively cleaned, and thereby the entirety of the cylindrical outer surface can be cleaned. The rotation speed of the electric motor may be constant or may be determined by an operator to be at any appropriate speed. It is preferable that the rotation speed be controlled in accordance with the state of filtration by detecting the turbidity of filtered water, the pressures inside and outside of the filter, and the like.

Untreated water that is not filtered and suspended particles that have settled in the case are successively discharged through the discharge channel in the bottom portion of the case. Thus, the present apparatus is characterized in that it performs filtration while continuously and constantly discharging suspended particles and untreated water that is not filtered. This is effective in increasing the treatment rate to a range of 10 to 20 ton/hour, which is required for treating ballast water, and further to a level of 100 ton/hour or more. Note that, although valves and the like in the discharge channel are not shown in the drawings, devices that are necessary for maintenance or for adjusting flow rate are provided. Filtered water that is filtered by the filter 101 is guided to a filtered water channel 107 through a water intake hole 105 that is formed in a central pipe 104, and flows to outside of the case.

Figure 4:
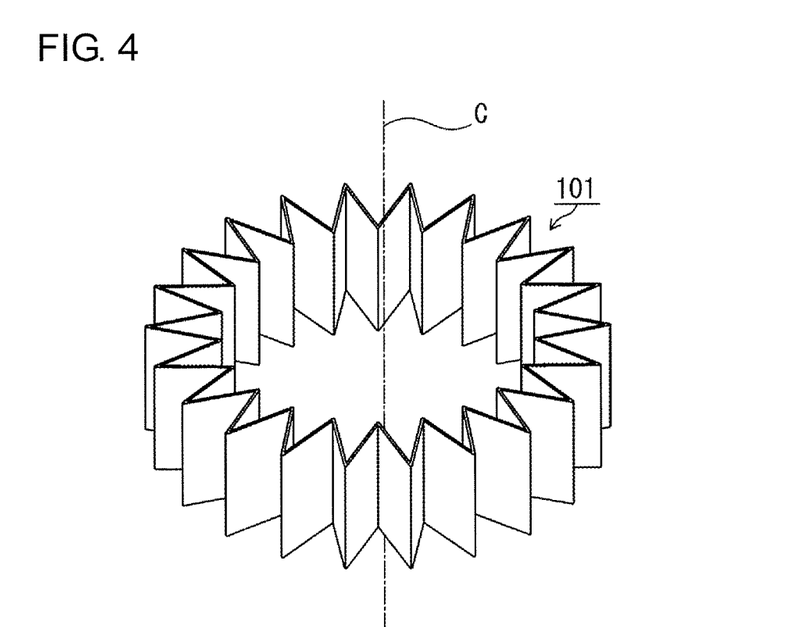
FIG. 4 is a perspective view showing a typical structure of a pleated filter that is preferably used in the present invention.

FIG. 4 is a perspective view showing a typical structure of a pleated filter that is preferably used in the present invention. This filter is made by folding a flat strip-shaped substrate so as to form a pleated shape by alternately forming protrusions and recesses and connecting ends of the strip to each other so as to form a cylindrical shape. In FIG. 4, untreated water, which is to be filtered, is supplied from outside of the filter 101, which is a cylindrical pleated filter, and water that has been filtered by the filter 101 is discharged from inside of the cylinder.

A porous resin sheet is used as the substrate of the filter. A porous structure such as a stretched porous body, a porous body by phase separation, or a non-woven cloth, which are made of, for example, polyester, nylon, polyethylene, polypropylene, polyurethane, polytetrafluoroethylene (PTFE), and polyvinylidene fluoride (PVdF) may be used. Because ballast water treatment is performed at a high flow rate, a non-woven cloth made of polyester, such as polyethylene terephthalate, is particularly preferably used. The dimensions of a pleated filter may be, for example, as follows: the outside diameter of the pleated filter is 700 mm, the length of the filter in the axial direction is 320 mm, the height of an effective area is 280 mm, the depth of pleats is 70 mm, and the number of pleats is 420. The effective area may be changed and a plurality of filters may be used in parallel in accordance with the amount of water needed to be treated.

Figure 5:
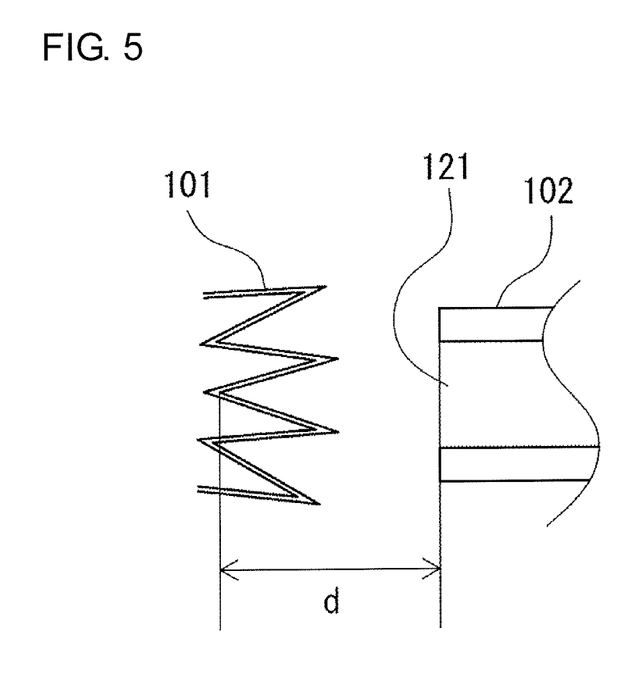
FIG. 5 is a diagram showing the positional relationship between a cleaning water nozzle and the filter.

FIG. 5 is a diagram showing the positional relationship between the nozzle opening 121 of the cleaning water nozzle 102 and the pleated filter. The distance d from an end of the nozzle opening to a surface of a recess of the filter will be referred to as the distance between the cleaning nozzle and the recess of the filter.

Figure 6:
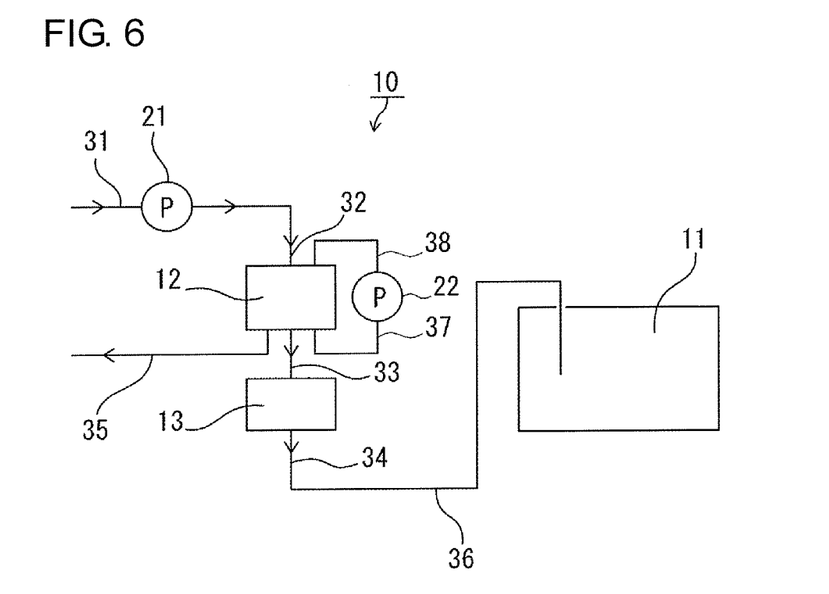
FIG. 6 is a block diagram showing another overall structure of a ballast water treatment system for a ship according to the present invention.

FIG. 6 schematically illustrates another overall structure of a ballast water treatment system for a ship according to the present invention. The elements the same as those of FIG. 1 are denoted by the same numerals, and redundant description will be omitted. The difference between FIG. 6 and FIG. 1 is that, the system further includes a circulation channel, including a pipe 37, a pump 22, and a pipe 38, for circulating untreated water that has not been filtered by the filtration apparatus 12 in order that the untreated water can be used as cleaning water. In this case, an untreated water nozzle and a cleaning water nozzle are independently provided.

Figure 7:
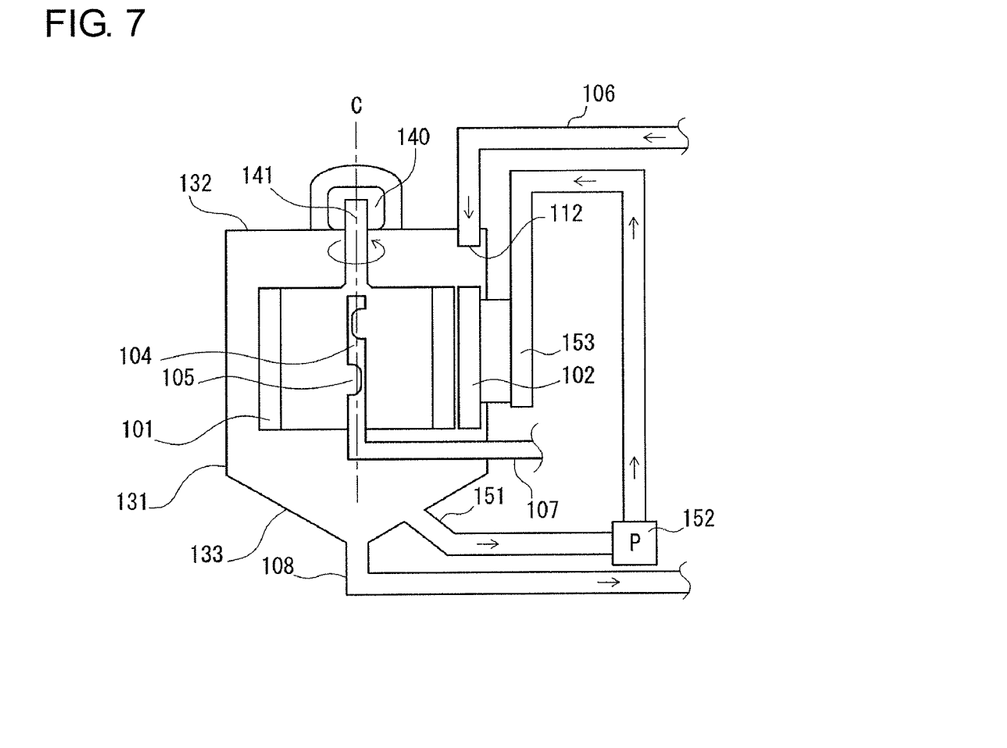
FIG. 7 is a schematic longitudinal sectional view showing an exemplary structure of a rotary filtration apparatus used in the system shown in FIG. 6.

Such a structure will be described with reference to FIG. 7. The elements the same as those of FIG. 2 will be denoted by the same numerals, and redundant description will be omitted. To be specific, the circulation channel, described above with reference to FIG. 6, includes a water intake channel 151, a pump 152, and a cleaning water channel 153. Untreated water, which circulates from the cleaning water channel 153, is supplied to the cleaning water nozzle 102. In addition, untreated water from the outside flows into the case through the untreated water channel 106 and an untreated water nozzle 112. In contrast to FIG. 1, the flow rate (flow speed) of cleaning water can be controlled independently from the flow rate of untreated water supplied, so that the degree of freedom of controlling the cleaning effect is increased.

EXAMPLES

Hereinafter, the results of filtering sea water under various conditions will be described. In each experiment, a continuous operation was performed for 12 hours under a predetermined condition and whether or not the filter was clogged was checked. Whether or not the filter was clogged was determined by measuring the differential pressure, which is the difference between the pressure of water inside the filter and the pressure of water outside of the filter. It was determined that clogging was "Present" in a case where the differential pressure was 50 kPa or more. Sea water used in the experiment was ordinary sea water taken at Imari City, Saga Prefecture. The saline concentration of the sea water was in the range of 2 to 4%, and the turbidity of the sea water was in the range of 1 to 1000 NTU.

The same experiment was performed by using three apparatuses having different structures. An apparatus A was an apparatus illustrated in FIG. 2 including a pleated filter that was made of a non-woven cloth and that could remove 99% or more of microorganisms in sea water having a size of 30 μm or more. The outside diameter of the pleated filter was 334 mm, the length in the axial direction was 200 mm, the pleat depth was 70 mm, and the number of pleats was 210. The outside diameter of the outer cylindrical portion was 406 mmφ. An apparatus B was an apparatus having the same structure as the apparatus A and made of the same material as the apparatus A, but the size of the apparatus B was larger than that of the apparatus A. A three-ply filter made of pleated filters each having the following dimensions was used: the outside diameter of the pleated filter was 700 mm, the length in the axial direction was 309 mm (the height of an effective area was 204 mm), the pleat depth was 70 mm, and the number of pleats was 420. An apparatus C was an apparatus having the structure illustrated in FIG. 7, including an untreated water nozzle and a cleaning water nozzle that were independent from each other. A filter the same as that of the apparatus A was used in the apparatus C. The nozzle opening was an oblong opening having a long side extending in the longitudinal direction of the pleats and a short side extending in the direction in which the pleats were arranged. The distance d between the nozzle opening and a surface of a recess of the filter (see FIG. 5) was defined as the nozzle distance (mm).

Tables I, II, and III show the results of experiments performed using these apparatuses. The cleaning flow speed is the flow speed of untreated water, which is cleaning water, that flows from the cleaning nozzle to the inside of the case. The higher the cleaning flow speed, the larger the cleaning effect. When the untreated water nozzle is also used as the cleaning nozzle, a larger amount of untreated water is introduced. The effective filtration area ($m^2$) is the area of a part of the pleated filter that is effective in filtering. The flow rate of filtered water ($m^3$/h (hour)) is the flow rate of water that is filtered by the filter and that is discharged from the filtered water channel. The flow rate of filtered water per unit area (m/h) is the quotient of the flow rate of filtered water divided by the effective filtration area of the filter. The flow rate of filtered water represents the flow rate of ballast water that can be treated by the apparatus. The higher the flow rate of filtered water, the larger the amount of ballast water that can be treated per unit time. The flow rate of discharged water ($m^3$/h) is the flow rate of water that is discharged to outside of the case through the discharge channel without being filtered. The discharge ratio (%) is (flow rate of discharged water)/(flow rate of filtered water), represented in percentage. If the discharge ratio is 100%, the flow rate of filtered water is the same as the flow rate of water that is discharged without being filtered. The sum of the flow of discharged water and the flow rate of filtered water is the flow rate of untreated water that is introduced into the apparatus. Therefore, the lower the discharge ratio, the higher the efficiency of the filter (the larger the flow rate of ballast water that can be treated). However, when the discharge ratio is low, the turbidity of untreated water that remains in the case without being filtered is high, and therefore clogging of filter is more likely to occur. The rotation speed (rpm) is the rotation speed of the filter, which affects the cleaning effect.

Table I shows the results of experiments performed using the apparatus A. From data numbers 1 to 5, it can be seen that clogging occurred when the cleaning flow speed was 200 m/min, and clogging did not occur when the cleaning flow speed was 250 m/min or more. From data numbers 5 to 9, it can be seen that clogging occurred when the rotation speed was 10 rpm or 120 rpm, and clogging did not occur when the rotation speed was within the range of 20 to 100 rpm. From data numbers 9 to 11, is can be seen that clogging occurred when the nozzle distance was 150 mm, and it was necessary that the nozzle distance be 120 mm or less. From data numbers 12 to 14, it can be seen that clogging occurred when the flow rate of filtered water per unit area was 6 m/h, and clogging did not occur when the flow rate of filtered water per unit was 5.1 m/h or less. From data numbers 15 and 16, it can be seen that clogging occurred when the discharge ratio was 3.7%, and clogging did not occur when the discharge ratio was 7.4%.

Table II shows the results of experiments performed using the apparatus B. From data numbers 21 to 23, it can be seen that clogging occurred when the flow rate of filtered water per unit area was 6 m/h, and clogging did not occur when the flow rate of filtered water per unit was 5.1 m/h or less. From data numbers 24 and 25, it can be seen that clogging occurred when the cleaning flow speed was 206 m/min, and clogging did not occur when the cleaning flow speed was 250 m/min or more. From data numbers 26 and 27, it can be seen that clogging occurred when the discharge ratio was 3.9%, and clogging did not occur when the discharge ratio was 5.1%.

Table III shows the results of experiments performed using the apparatus C. From data numbers 31 to 33, it can be seen that clogging occurred when the cleaning flow speed was 200 m/min, and clogging did not occur when the cleaning flow speed was 250 m/min or more. From data numbers 34 to 35, it can be seen that clogging occurred when the flow rate of filtered water per unit area was 6 m/h, and clogging did not occur when the flow rate of filtered water per unit was 4.3 m/h or less. From data numbers 36 to 38, it can be seen that clogging occurred when the discharge ratio was 4.0%, and clogging did not occur when the discharge ratio was 5.0% or 40%.

TABLE I

| Data number | Apparatus | Cleaning flow speed m/min | Effective filtration area m² | Flow rate of filtered water per unit area m/h | Flow rate of filtered water m³/h | Flow rate of discharged water m³/h | Discharge ratio % | Nozzle distance mm | Rotation speed rpm | Clogging Present/absent |
|---|---|---|---|---|---|---|---|---|---|---|
| 1 | A | 200 | 5.82 | 1.7 | 10.0 | 9.2 | 92.0 | 74 | 49 | Present |
| 2 | A | 250 | 5.82 | 2.6 | 15.3 | 8.7 | 56.9 | 74 | 50 | Absent |
| 3 | A | 300 | 5.82 | 3.4 | 20.0 | 8.8 | 44.0 | 74 | 51 | Absent |
| 4 | A | 350 | 5.82 | 4.3 | 25.3 | 8.6 | 34.0 | 74 | 48 | Absent |
| 5 | A | 400 | 5.82 | 3.4 | 20.0 | 18.4 | 92.0 | 74 | 20 | Absent |
| 6 | A | 400 | 5.82 | 3.4 | 20.0 | 18.4 | 92.0 | 74 | 10 | Present |
| 7 | A | 400 | 5.82 | 3.4 | 20.0 | 18.4 | 92.0 | 74 | 100 | Absent |
| 8 | A | 400 | 5.82 | 3.4 | 20.0 | 18.4 | 92.0 | 74 | 120 | Present |
| 9 | A | 400 | 5.82 | 3.4 | 20.0 | 18.4 | 92.0 | 74 | 53 | Absent |
| 10 | A | 400 | 5.82 | 3.4 | 20.0 | 18.4 | 92.0 | 120 | 45 | Absent |
| 11 | A | 400 | 5.82 | 3.4 | 20.0 | 18.4 | 92.0 | 150 | 50 | Present |
| 12 | A | 400 | 5.82 | 4.3 | 25.3 | 13.4 | 53.0 | 74 | 55 | Absent |
| 13 | A | 400 | 5.82 | 5.1 | 30.0 | 8.4 | 28.0 | 74 | 53 | Absent |
| 14 | A | 400 | 5.82 | 6.0 | 35.3 | 3.1 | 8.8 | 74 | 49 | Present |
| 15 | A | 292 | 5.82 | 4.6 | 27.0 | 1.0 | 3.7 | 74 | 47 | Present |
| 16 | A | 302 | 5.82 | 4.6 | 27.0 | 2.0 | 7.4 | 74 | 46 | Absent |

TABLE II

| Data number | Apparatus | Cleaning flow speed m/min | Effective filtration area m² | Flow rate of filtered water per unit area m/h | Flow rate of filtered water m³/h | Flow rate of discharged water m³/h | Discharge ratio % | Nozzle distance mm | Rotation speed rpm | Clogging Present/absent |
|---|---|---|---|---|---|---|---|---|---|---|
| 21 | B | 486 | 36 | 3.4 | 120.0 | 20.0 | 16.7 | 81 | 46 | Absent |
| 22 | B | 694 | 36 | 5.1 | 179.9 | 20.0 | 11.1 | 81 | 51 | Absent |
| 23 | B | 805 | 36 | 6.0 | 211.7 | 20.0 | 9.4 | 81 | 49 | Present |
| 24 | B | 206 | 36 | 1.3 | 45.9 | 13.6 | 29.7 | 81 | 47 | Present |
| 25 | B | 250 | 36 | 1.7 | 60.0 | 12.0 | 20.0 | 81 | 50 | Absent |
| 26 | B | 369 | 36 | 2.9 | 102.3 | 4.0 | 3.9 | 81 | 51 | Present |
| 27 | B | 373 | 36 | 2.9 | 102.3 | 5.2 | 5.1 | 81 | 52 | Absent |

TABLE III

| Data number | Apparatus | Cleaning flow speed m/min | Effective filtration area m² | Flow rate of filtered water per unit area m/h | Flow rate of filtered water m³/h | Flow rate of discharged water m³/h | Discharge ratio % | Nozzle distance mm | Rotation speed rpm | Clogging Present/absent |
|---|---|---|---|---|---|---|---|---|---|---|
| 31 | C | 200 | 5.82 | 2.6 | 15.3 | 8.0 | 52.3 | 74 | 54 | Present |
| 32 | C | 250 | 5.82 | 2.6 | 15.3 | 8.0 | 52.3 | 74 | 51 | Absent |
| 33 | C | 416 | 5.82 | 2.6 | 15.3 | 8.0 | 52.3 | 74 | 50 | Absent |
| 34 | C | 550 | 5.82 | 6 | 35.3 | 13.0 | 36.8 | 74 | 48 | Present |
| 35 | C | 550 | 5.82 | 4.3 | 25.3 | 13.0 | 51.4 | 74 | 49 | Absent |
| 36 | C | 416 | 5.82 | 3.4 | 20.0 | 0.8 | 4.0 | 74 | 47 | Present |
| 37 | C | 416 | 5.82 | 3.4 | 20.0 | 1.0 | 5.0 | 74 | 51 | Absent |
| 38 | C | 416 | 5.82 | 3.4 | 20.0 | 8.0 | 40.0 | 74 | 46 | Absent |

The invention claimed is:

1. A ballast water treatment method for a ship performed on a filtration system, the filtration system having a rotary filtration apparatus including a filter with a cylindrical shape that surrounds an axis, the filter being pleated with folds in a cylinder radial direction, a cleaning nozzle for ejecting untreated water, a case that includes an outer cylindrical portion that surrounds the filter, a nozzle opening of the cleaning nozzle disposed inside the case, a filtered water channel through which filtered water is passed, a discharge channel through which discharged water that has not passed through the filter is discharged to an outside of the case, and an electric motor for rotating the filter, the method comprising the steps of:

rotating the filter by the electric motor at a rotation speed during a filtering operation in a range of 20 rpm to 100 rpm;

ejecting untreated water by the a cleaning nozzle towards an outer peripheral portion of the filter at a flow speed of 250 m/min or more;

passing filtered water filtered by the filter by the filtered water channel from a cylindrical space inside the filter to the outside of the case at a flow rate of filtered water per unit area of the filter at 5.1 m/h or less; and discharging water that has not passed through the filter via a discharge channel to the outside of the case at a flow rate of 5% or more of the flow rate of filtered water, wherein a distance between the cleaning nozzle and a recess of the filter is 120 mm or less, and the filter has an effective filtration area of 5 m² or more and is made of a non-woven cloth and the filter removes 99% or more of microorganisms in sea water having a size of 30 μm or more.

* * * * *